United States Patent [19]

Faria

[11] 4,291,861
[45] Sep. 29, 1981

[54] GATE VALVE WITH SLIDEABLE CLOSURE EXPANDABLE UPON OSCILLATION

[75] Inventor: Carl R. Faria, San Leandro, Calif.

[73] Assignee: Thermionics Laboratory, Inc., Hayward, Calif.

[21] Appl. No.: 175,129

[22] Filed: Aug. 4, 1980

[51] Int. Cl.³ .............................................. F16K 25/00
[52] U.S. Cl. .................................... 251/158; 251/197; 251/232; 251/335 B
[58] Field of Search ............... 251/158, 167, 195, 197, 251/199, 215, 232, 335 B

[56] References Cited

U.S. PATENT DOCUMENTS

| | | | |
|---|---|---|---|
| 2,986,371 | 5/1961 | Knox | 251/197 X |
| 3,185,435 | 5/1965 | Hauser | 251/158 |
| 3,237,916 | 3/1966 | Bryant | 251/158 |
| 3,397,862 | 8/1968 | Batzer | 251/158 X |

Primary Examiner—Harold W. Weakley
Attorney, Agent, or Firm—Julian Caplan

[57] ABSTRACT

Gate valve having in-line ports has a closure member which slides in an elongated casing between an operative position between the ports to a retracted position remote from the ports. When in operative position, the closure has a seated or expanded position against the ports and a collapsed position out of contact with the ports. Movement between collapsed and expanded positions is accomplished by oscillation of a portion of the closure member relative to plates which seat against the ports as balls which are seated in detent depressions in the plates are forced out of the depressions. The same actuator linkage which moves the closure linearly also casues oscillation.

13 Claims, 7 Drawing Figures

GATE VALVE WITH SLIDEABLE CLOSURE EXPANDABLE UPON OSCILLATION

This invention relates to a new and improved gate valve of the type having a slideable closure which is expandable and contractable upon oscillation of a portion of the closure member.

In many installations, of which high vacuum equipment is a typical example, there are two valve ports in line. It is necessary to withdraw the closure from the vicinity of the ports so that there is an unobstructed passage through the ports. In such installations, as well as others, it is necessary that the closure be retractable away from the ports. When the closure is between the ports it must be expandable so as to seat against the ports.

Thus, valves of this type in their fully opened position are retracted away from the valve ports and the closure is collapsed. Sequentially, the closure is then moved into an operative position between the ports and then it is expanded to seat against the ports. To open the valve, the reverse operations are performed.

Further in accord with this type of valve, there are other roller elements between the gate plate and a backing plate which engage the two ports heretofore mentioned. In both the plates there are depressions which function as detents. In contracted position of the closure, the balls or rollers are seated in the detents. In accordance with the present invention, oscillation of a portion of the closure member causes the balls to roll out of the depressions and hence to force the plates away from the body, expanding the closure. To open the valve, the oscillatory movement is reversed and the balls re-enter the depressions, a spring causing the plates to move together and collapsing the closure.

A distinguishing feature of the present invention is that the closure member has oscillating portions which effect the expansion and contraction of the valve closure. A particular advantage of the invention is the fact that the oscillation occurs between members which do not engage the valve seats. Hence, there is no wear on the gate plate or back-up plate or the seals therefor by reason of a relative sliding of the parts. Hence, wear and maintenance problems are reduced.

In accordance with the present invention, there is no longitudinal or linear movement of the closure as it is expanding and contracting. The closure expands by relative oscillation of the closure body and the gate and backing plate.

The present invention differs from a valve such as that shown in U.S. Pat. No. 3,368,792 in several ways. One difference is that the detents which cause the closure to seat are always concentric with the center of the closure, thereby keeping the load equally distributed at all times and also minimizing the length of the valve body.

Another important difference is that the rollers or balls are not in contact with each other, but are separated by a race plate.

Still another distinction over the prior art is that the rollers which engage the gate plate are on a different axis circle than the rollers which engage the support plate. Since both the sets of balls engage the race plate, and since they engage the race plate on different axes, there are forces which tend to distort the race plate, providing an added resilient action to both plates.

Accordingly, principal objects of the present invention are to provide a closure which is completely and easily retracted from the area of the valve ports, and secondly to provide for expansion and contraction of the closure by oscillation of some of the parts relative to the non-rotating gate and support plate.

Other objects of the present invention will become apparent upon reading the following specification and referring to the accompanying drawings in which similar characters of reference represent corresponding parts in each of the several views.

Figure 1:
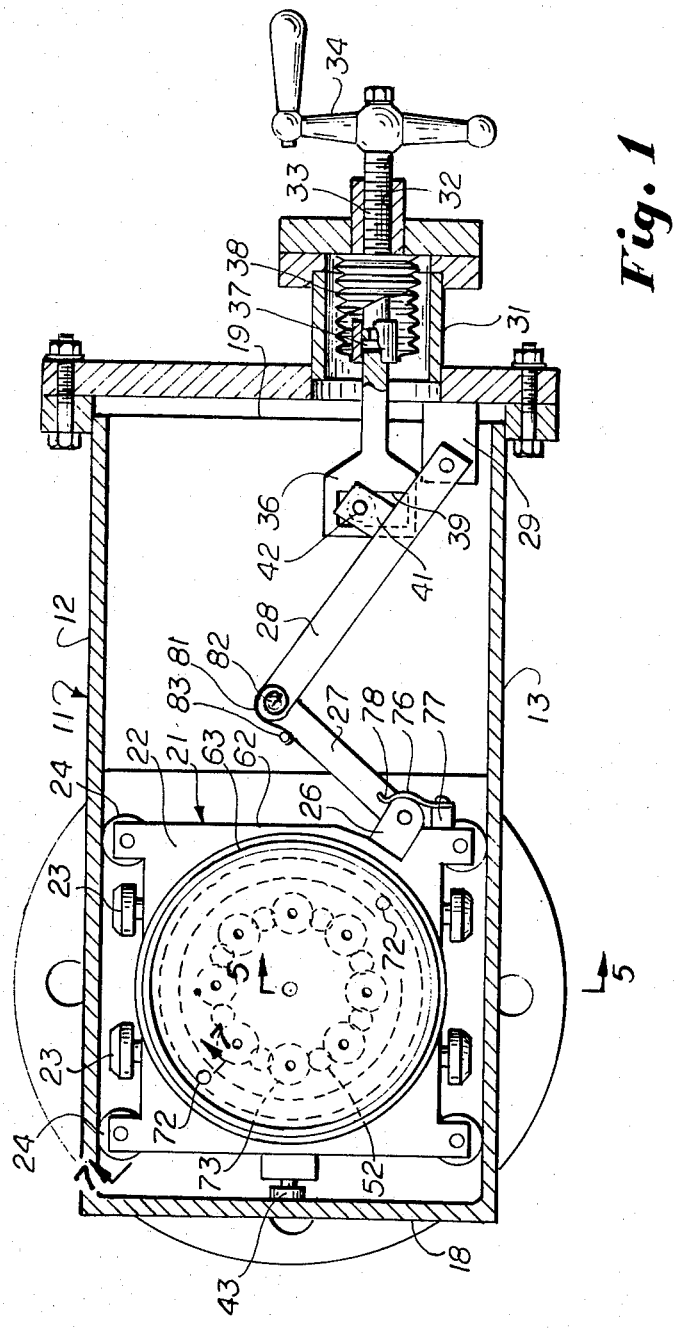
FIG. 1 is a somewhat schematic vertical sectional view through a valve in accordance with the present invention in closed position.
Figure 4:
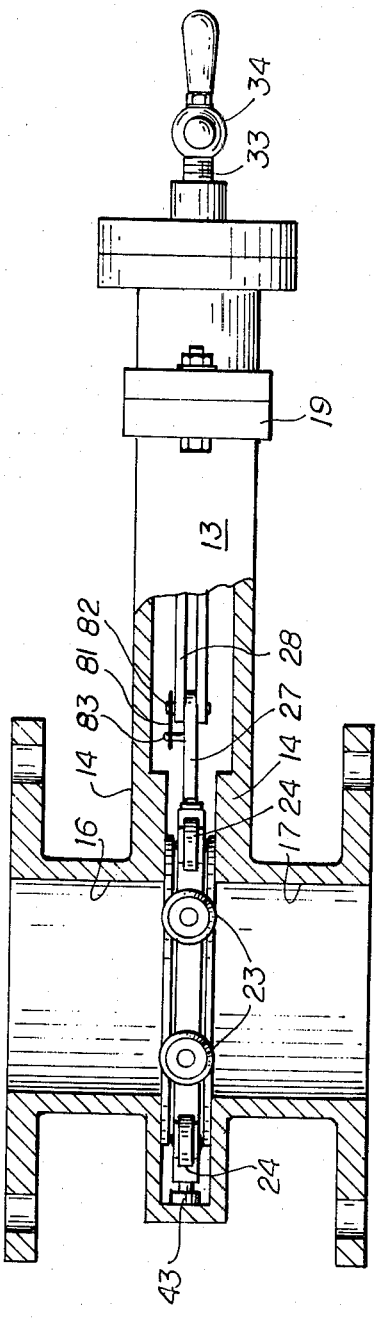
FIG. 4 is an elevational view taken of the structure of FIG. 1 partially broken away to reveal internal structure.

The valve of the present invention is installed in a hermetically sealed casing 11 having opposed longitudinally extending sides 12, 13, front and back plates 14, rearward end 18 and forward end 19. In a vacuum installation, there is a high vacuum port 16 in one of the plates 14 adjacent the rearward end 18, and in line with the port 16 is a second port 17 on the opposite plate 14. Reciprocal between the operative position shown in FIG. 1 and the retracted position shown in FIG. 3 is a closure 21, hereinafter described in detail.

Closure 21 has a main body 22, which is generally square in peripheral outline as viewed in FIG. 1, but has projections in which are rotatably mounted lateral support wheels 23 which engage plates 14 and also mounted on body 22 are transverse support wheels 24 which engage sides 12 and 13. Main body 22 is centrally apertured and oscillatable within the aperture in body 22, as hereinafter explained, is ball cage 46. Cage 46 has an ear 26 which extends beyond the outline of body 22. Pivoted to ear 26 is a first link 27 and on the outer end of link 27 is pivoted second link 28. Forward end 19 has a lug 29 to which is pivoted the end of second link 28 opposite first link 27.

One type actuator is illustrated and described, it being understood that other actuators may be used. Extending outward from forward end 19 is a housing 31 having a threaded apertured end 32. Threaded into end 32 is a rod 33 which has a handle 34 on its outer end or other means for turning the rod 33. Within the casing 11 is a block 36 which is connected to the inner end of rod 33 by a rotatable connection 37. In pressure differential installations a bellows seal 38 is positioned within the housing 31, being sealed at one end to the end 32 and at the other end to the block 36. This prevents leakage. Block 36 is formed with a slot 39. Lug 41 on second link 28 is a clevis through which is a pin 42 through slot 39.

Figure 2:
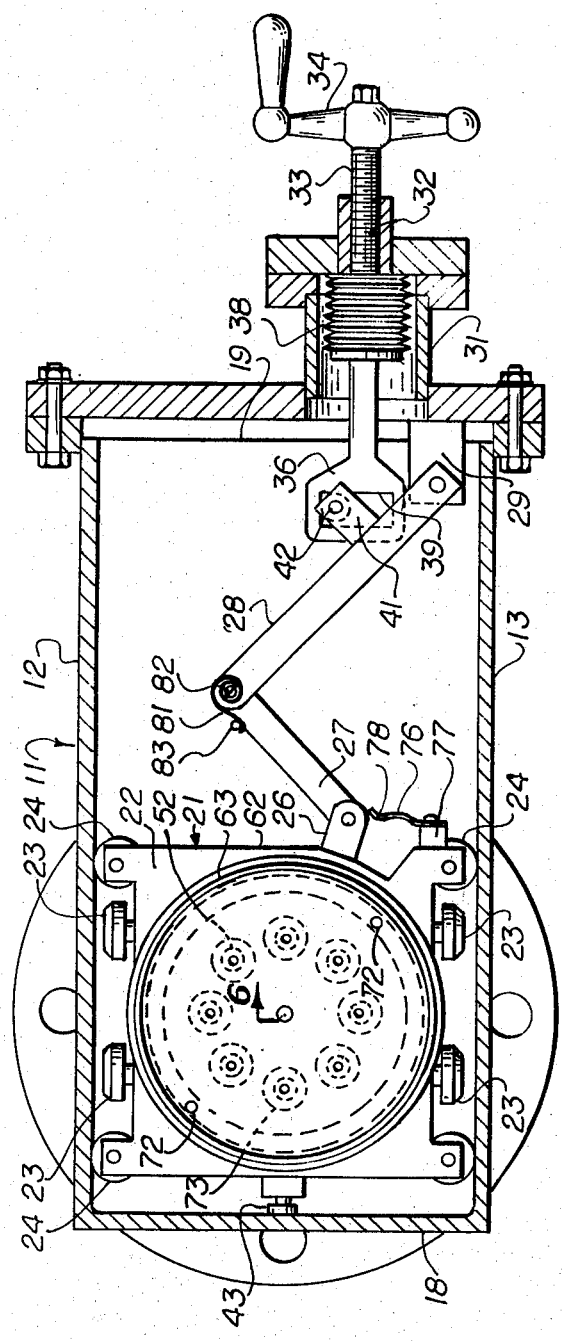
FIG. 2 is a view similar to FIG. 1 showing the closure partially retracted and the closure collapsed.
Figure 3:
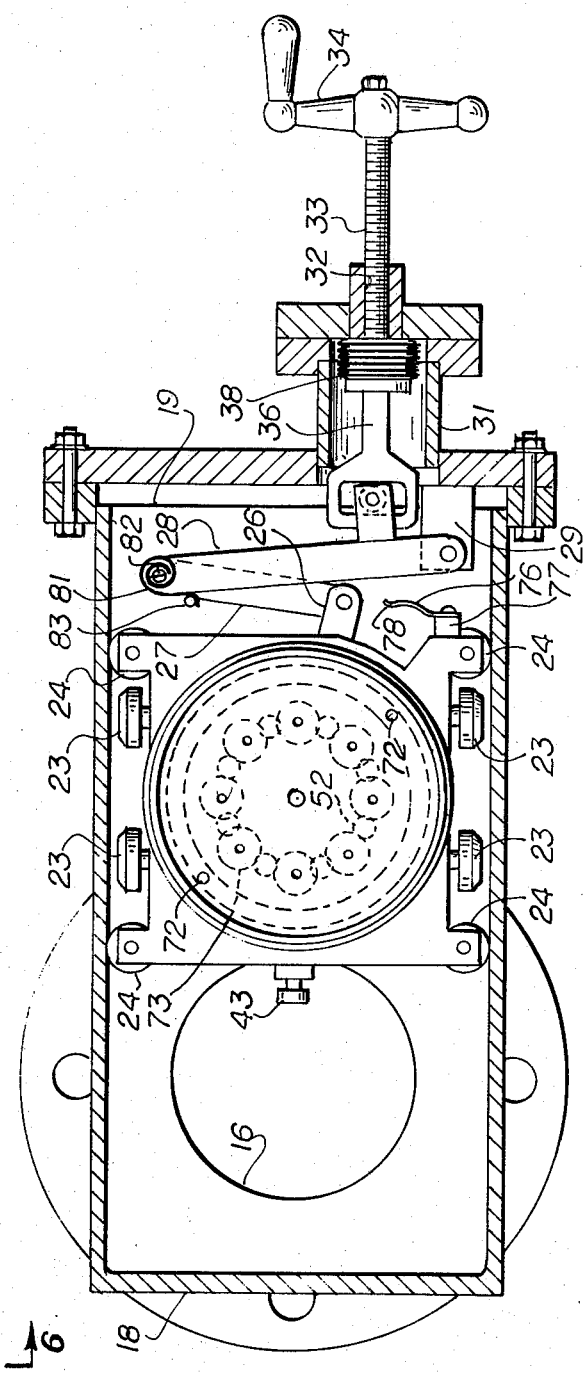
FIG. 3 is a view similar to FIG. 1 showing the closure collapsed and fully retracted.

Directing attention now to FIGS. 1–3, by turning handle 34 in a counter-clockwise direction as viewed from the right end of FIG. 1, rod 33 moves outward, pulling link 28 in a clockwise direction relative to lug 29 and also pulling link 27 toward the right as viewed in FIG. 1. The first movement of ear 26 is in a counterclockwise direction from the position of FIG. 1 to the position of FIG. 2. As hereinafter explained, this causes the closure 21 to collapse. Continued turning of the handle 34 causes the parts to assume the position of FIG. 3 and it will be noted that the closure 21 is completely withdrawn from the vicinity of the ports 16, 17.

To reverse the procedure, with the valve in the retracted position of FIG. 3, the handle 34 is turned in a clockwise direction, as viewed from the right-hand end of FIG. 3, and this causes the closure 21 to move toward the left until it approaches the position of FIG. 2. On the forward ends of body 22 are adjustable stops 43. When these stops engage rearward end 18 they prevent further movement of body 22. Thereupon, continued turning of rod 33 causes the ear 26 to be oscillated in a clockwise direction through a short arc of movement. This, as hereinafter explained, causes expansion of the closure 21.

It will be understood that other means for moving the closure 21 through its path of travel may be used. That illustrated in FIGS. 1-3 is one preferred embodiment. It is also contemplated that the means for causing movement of the lug 28 may be different from the mechanism which moves the closure between retracted and operative position.

Ball cage 46 (FIG. 5) consists of an upper section 47 of circular periphery, a lower section 48 and a connection 49 between the two sections which extends through the central large aperture in the main body 22. Upper and lower bearings 50 are interposed between the main body 22 and the sections 47, 48 to facilitate relative oscillation.

Formed in upper section 47 are a plurality of holes 51, here shown as 8 in number, and fitting in the holes 51 are balls 52. In the lower section 48 are similar holes 53 in which fit balls 54. It will be noted that the hole centers of holes 51 are at a different location relative to the center of the ball cage 46 than the holes 53, and that the balls 52, 54 are not vertically aligned.

Interposed between the balls 52, 54 is an annular race plate 56. By reason of the fact that the balls 52 are spaced differently relative to the balls 54, when there is inward pressure, there is a distortion of the plate 56 from its naturally flat condition which biases the balls 52, 53. Located centrally and extending between sections 47 and 48 is a cage hub 57, which is of sleeve-like shape. A bearing 58 is interposed between the hub 57 and the race plate 56 to facilitate rotation of plate 56. Thus, it is seen that the cage 46 oscillates relative to the main body 22 and that the race plate 56 is freely rotatable relative both to the cage 46 and body 22.

Figure 6:
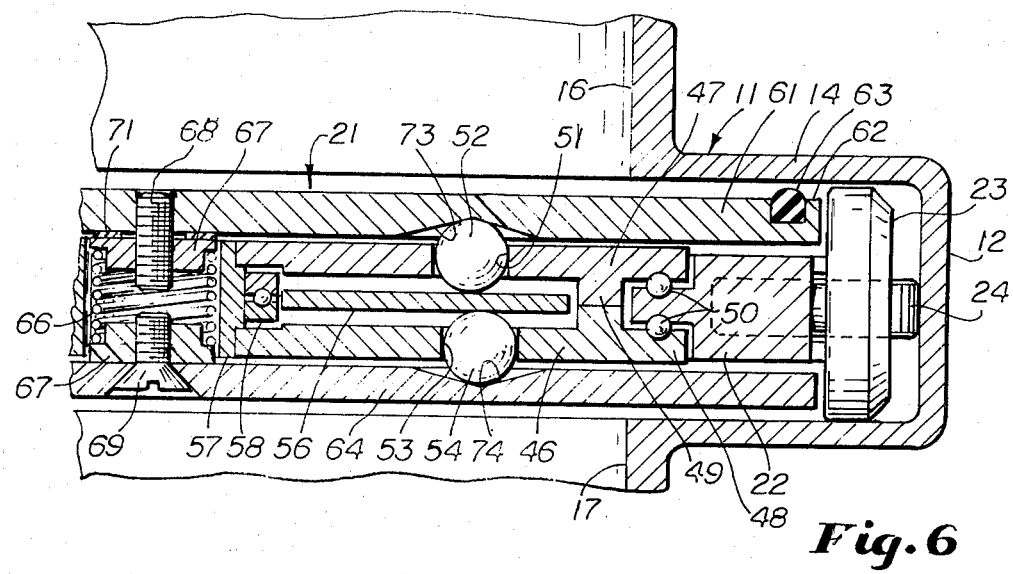
FIG. 6 is a view similar to FIG. 5 showing the closure in collapsed condition.
Figure 5:
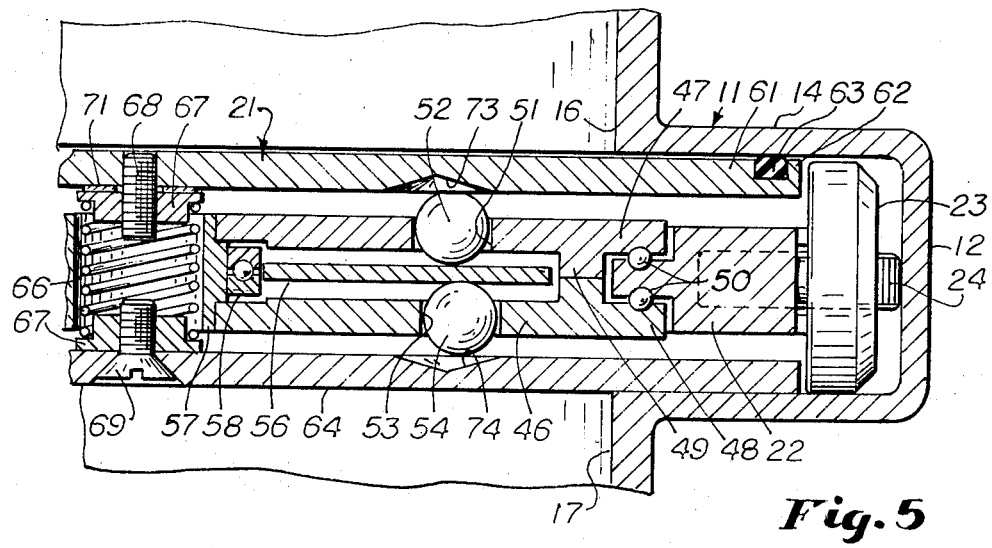
FIG. 5 is a view taken substantially along the line 5—5 of FIG. 1.

On the top of the closure 21, as viewed in FIGS. 5 and 6, is the gate plate 61 which, when properly actuated, seals against gate 16, as shown in FIG. 6. Gate plate 61 has a peripheral rim 62 in which is located a seal 63 of numerous materials, including viton, copper, etc. Below the closure 21, as shown in FIG. 6, is the support plate 64 which bears against port 17 when the closure is in expanded condition. It is not necessary that the support plate 64 be provided with a seal similar to the seal 64, although such a seal may be provided.

Figure 7:
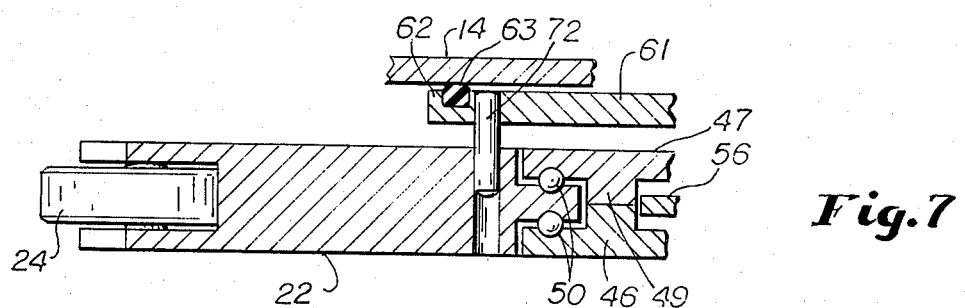
FIG. 7 is a view taken substantially along the line 7—7 of FIG. 1.

Torque pins 72 (shown in FIG. 7) are affixed to gate plate 61 and slideably extend into holes in main body 22 to prevent rotation of the plate 61. Hence, the plate 61 moves inwardly and outwardly, but does not oscillate relative to the body 22. Similar pins prevent oscillatory movement of backing plate 64.

Within the hub 57 is an extension spring 66 secured to end caps 67 at either end. Plate 61 has an integral mounting screw 68 on to which is threaded the upper end cap 67 secured by lock washer 71. Mounting screw 69 secures the support plate 64 to the lower end cap 67. The ends of the spring 67 are secured to the end caps 67 and bias the plates 61, 64 inwardly to contracted position shown in FIG. 6. Other springs may be added between plate 61 and support plate 64 to increase capability for retraction of gates at greater than normal pressure differentials.

Formed on the inner surface of plate 61 are depressions 73 which comprise, along with the balls 52, detents. The walls of the depressions 73 are at varying angles. In the contracted position of the closure 21 shown in FIG. 6, the balls 52 are seated in the depressions 73. However, when the cage 46 is oscillated relative to the main body 22 and plate 61, the balls 52 roll out of the depressions 73 causing the plate 61 to move against the force of the spring 66 to expanded position, shown in FIG. 5. When the cage 46 is returned to its position shown in FIGS. 2 and 3, the spring 66 restores the plate 61 to the position of FIG. 6.

Similarly, there are depressions 74 in the inner surface of support plate 64 and balls 54 fit into these depressions in the collapsed condition shown in FIG. 6, and roll out of the depressions 74 in the expanded position of FIG. 5.

Thus, in operation, in the retracted, collapsed position of FIG. 3, the closure 21 is retracted from the ports 16, 17. As the rod 33 is turned, the closure 21 is moved to the left to the position shown in FIG. 2, blocking the ports 16 and 17. When the adjustable stops 43 abut end 18, movement of the closure 21 terminates. Continued turning of the rod 33 causes the lug 26 to oscillate from the position of FIG. 3 to the position of FIG. 1, causing the balls 52 and 54 to leave their respective depressions 73 and 74, thereby forcing the plates 61, 64 apart and causing the race plate 56 to be flexed because of the location in which the centers of the balls 52, 54 are positioned. Spring 66 is, of course, extended.

When the valve is to be opened, the rod 33 is turned in opposite direction, returning the lug 26 to the position shown in FIG. 2, and oscillating the cage 46 back to its original position, whereupon the balls 52 roll into the depressions 73 and the balls 54 into the depressions 74. The movement of the race plate 56 and the tension of the spring 66 cause the plates 61, 64 to retract to the collapsed position shown in FIG. 6. Continued turning of the rod 33 restores the closure 21 to its retracted position shown in FIG. 3.

Cage lock spring 76 is fixed to a projection 77 on main body 22. Spring 76 has a curved main portion and a cam guide 78 at its outer end which engages ear 26. Such a spring 76 is desirable particularly when the physical size and weight of the linkage members 27, 28 is large. Such linkage members tend to inadvertently rotate the arm 26 to a position that contracts the plates 61 and 64. Spring 76 holds the radial arm 26 from acting with these forces, preventing the rotation of arm 26 when it is not intended to be rotated.

Torque spring 81 is of a spiral configuration. The inner end of the spiral is fixed to pin 82 which connects the links 27 and 28. The outer end of spring 81 is connected to a pin 83 on link 27. Spring 81 has several functions. A first function is to overcome the initial load exerted on the ear 26 by the link 27. The initial thrust of link 27 is in a direction which tends to rotate the ear 26, and this will cause a premature expansion of plates 61 and 64 jamming the closure member 22 in the valve body. The torsion load supplied by the spring 81 accelerates the forward movement of the member 21, reducing the rotation thrust on ear 26.

A second function of spring 81 occurs by reason of the fact that the load at the pivot pin 82 between links 27 and 28 is always in a direction which tends to force them apart. If links 27 and 28 are held in this position by spring 81, counter force is produced by a position indicator spring, bellows 38 and gravitational pull on the links (when the valve is mounted in certain positions) will be reduced to a minimum. Thus, the closure member is kept in the expanded position and is also kept from opening prematurely.

When opening the valve, the operation is reversed.

What is claimed is:

1. A gate valve comprising an elongated casing having sides, top, bottom, and first and second ends, first and second ports in said sides adjacent said first end positioned in line, a closure within said body moveable between said first and second ends, and actuating means for moving said closure, said closure comprising a body, a cage in said body having an upper section and a lower section and mounted in said body for arcuate movement relative to said body, rotary elements caged in said upper section extending partially out of said upper section, a gate plate adjacent said upper section formed with depressions positioned to receive said rotary elements, resilient means biasing said gate plate toward said upper section, and cage moving means for imparting arcuate movement to said cage relative to said body and thereby to roll said rotary elements out of said depressions to force said gate plate away from said upper section and into sealing engagement with said first port.

2. A valve according to claim 1 in which said cage moving means is actuated by said actuating means when said closure has been moved to the maximum extent of its travel toward said first end.

3. A valve according to claim 1 which further comprises second roller elements caged in said lower section and extending partially out of said lower section, a support plate adjacent said lower section formed with second depressions positioned to receive said second rotary elements, second resilient means biasing said support plate toward said lower section, arcuate movement of said cage rolling said second rotary elements out of said second depressions to force said support plate away from said lower section and into engagement with said second port.

4. A valve according to claim 3 in which said first-mentioned rotary elements are arcuately spaced about a first circle having its center on the axis of rotation of said cage and said second rotary elements are arcuately spaced about a second circle concentric with said first circle of different diameter than said first circle.

5. A valve according to claim 4 which further comprises a race plate within said cage, said first-mentioned rotary elements engaging one face of said race plate and said second rotary elements engaging the opposite face of said race plate.

6. A valve according to claim 3 which further comprises a race plate within said cage, said first-mentioned rotary elements engaging one face of said race plate and said second rotary elements engaging the opposite face of said race plate.

7. A valve according to claim 6 which further comprises an annular hub centrally positioned in said cage fixed to said cage, said first-mentioned resilient means and said second resilient means comprising a single extension coil spring having attachment means at either end to secure said spring to said gate plate and said support plate.

8. A valve according to claim 7 in which said race plate is rotatably mounted relative to said hub.

9. A valve according to claim 1 which further comprises rotatable support wheels mounted on said body engaging said sides, top and bottom of said casing.

10. A valve according to claim 1 which further comprises means to restrain rotative movement of said gate plate relative to said body and said first port.

11. A valve according to claim 1 which further comprises an adjustable stop on said body to engage said first end to limit movement of said closure toward said first end with said gate plate accurately aligned with said first port.

12. A valve according to claim 1 in which said actuating means comprises an ear fixed to said cage, a first link pivoted at its first end to said ear, a second link pivoted at its first end to the second end of said first link and at its second end to said casing, reciprocating means in said casing operable to move inward and outward relative to said casing at said second end and means articulately connecting said reciprocating means and said second link intermediate the ends of said second link.

13. A valve according to claim 12 in which said casing is hermetically sealed and which further comprises means hermetically sealing said reciprocating means relative to said casing.

* * * * *